United States Patent [19]
Willey

[11] Patent Number: 5,782,527
[45] Date of Patent: Jul. 21, 1998

[54] ACCESSORY FOR SUNROOF AIR DEFLECTOR

[76] Inventor: Barry A. Willey, 727 Ela Rd., Inverness, Ill. 60067

[21] Appl. No.: 549,387

[22] Filed: Oct. 27, 1995

[51] Int. Cl.$^6$ ........................................... B60J 7/22
[52] U.S. Cl. ........................................... 296/217
[58] Field of Search ........................... 296/217, 91

[56] References Cited

U.S. PATENT DOCUMENTS 4,176,876  12/1979  Sorensen ........................... 296/217

FOREIGN PATENT DOCUMENTS 3132713  3/1983  Germany ........................... 296/217

*Primary Examiner*—Joseph D. Pape
*Attorney, Agent, or Firm*—James T. Fitzgibbon

[57] ABSTRACT

A hold-down assembly for a sunroof air deflector. The assembly includes a housing, a lever positioned within the housing, and a hook, preferably with an extensible shank, carried by a part of the lever. The lever includes a first leg with an outer surface movable by the finger of a user, and at least one offset leg. The offset leg includes a hook carrier and a pivot portion, and the housing has a feature, preferably a T-slot, for guiding the hook carrier through a substantially vertical path, and for guiding the pivot portion through a substantially horizontal path, including portions lying to either side of the vertical path, to provide an over-center locking action to hold the deflector in place.

13 Claims, 2 Drawing Sheets

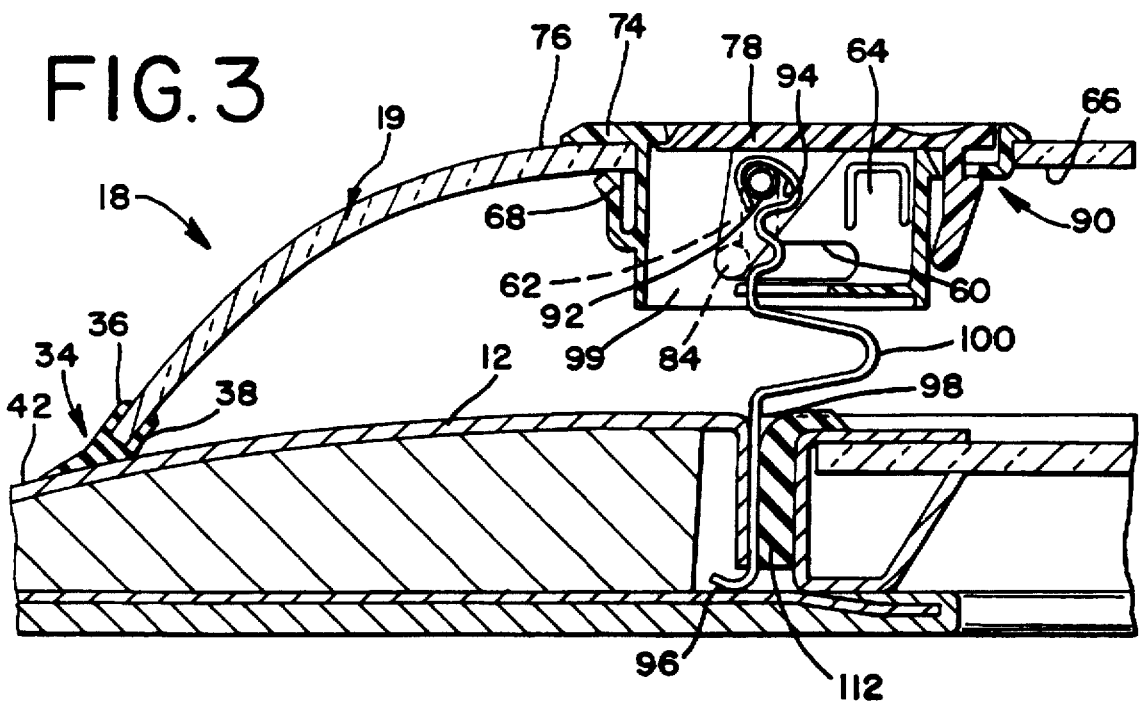
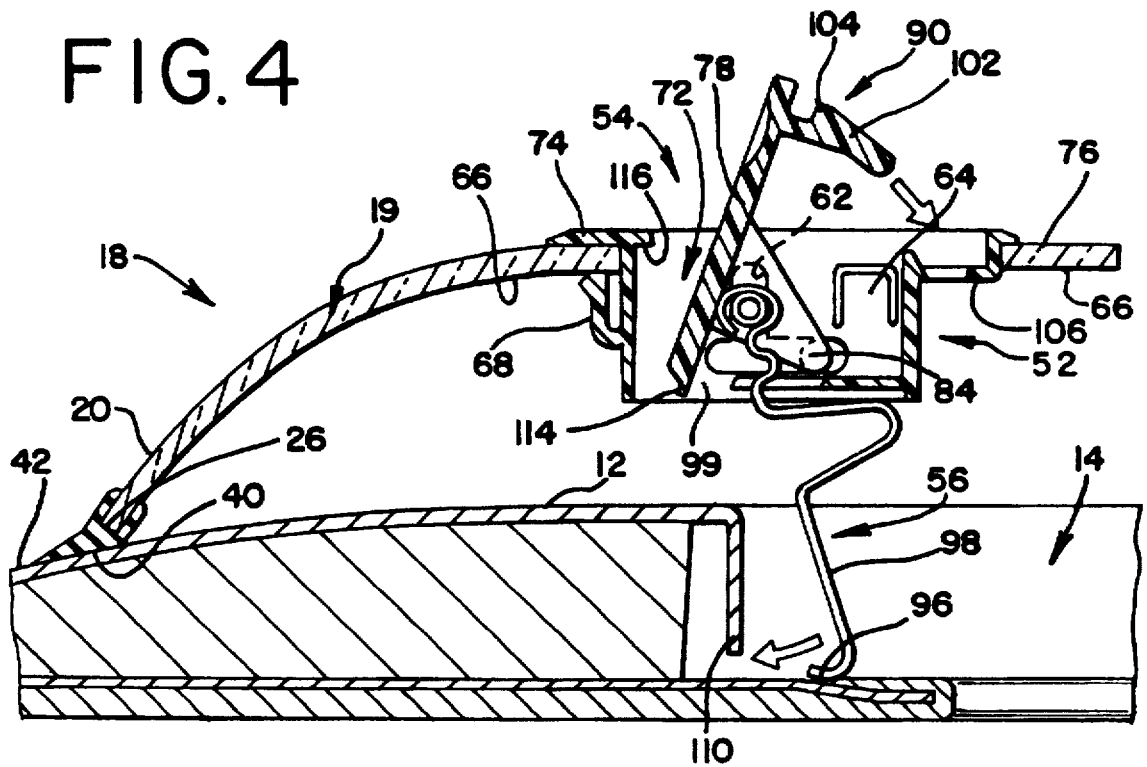

ACCESSORY FOR SUNROOF AIR DEFLECTOR

BACKGROUND OF THE INVENTION

The present invention relates generally to automotive accessories and more particularly to attachments for vehicle sunroofs.

In recent years, there has been a continuing demand for sunroofs in automotive vehicles, with automobiles of all sorts and even trucks being equipped with sunroofs. The perceived advantage of sunroofs include the ability to provide an open top vehicle without sacrifice of structural rigidity, the general open air feeling which results from such a construction and in particular, the ability of the vehicle, when the sunroof is closed, to provide a relatively weather-tight, low noise environment equal to that provided in the absence of the sunroof. In this connection, all or almost all of the sunroofs of modern vehicles are of the rigid or all-metal exterior type, even though sunroofs with flexible components are also known to the industry.

One of the disadvantages of a sunroof, however, is that wind turbulence in the vicinity of the leading edge of the opening, and the general geometry of the opening, which must be congruent with the shape of the vehicle roof, inherently creates some problems of noise and turbulence. Accordingly, in recent years, a number of vehicles with sunroofs have added, as an accessory to the vehicle, what is termed a sunroof air deflector. This unit acts much in the manner of the vehicle windshield in a conventional automobile or motorcycle, and generally resembles such a windshield except that its proportions and shapes are somewhat different.

The typical sunroof air deflector has a support edge portion which usually extends transversely of the major part of the vehicle roof and terminates in laterally outside or wing portions that are swept out and back, extending roughly parallel to the sides of the automobile. The trailing edge of the deflector includes a main portion which extends transversely to the movement axis of the vehicle and is generally horizontal in the normal position of the vehicle, with this trailing edge also having outer end portions turned down to meet the ends of the support edges adjacent the vehicle roof.

Customarily, such sunroof air deflectors are made from a plastic material which is stiff but resilient, such as from an acrylic or other thermoplastic material. Sunroof air deflectors may be made from other materials, including different plastics, metal, or the like, although the acrylic plastics are presently preferred for a number of reasons.

The manner of securing a sunroof air deflector to a vehicle roof has also been the subject of research and development. Because of the loading created by rapid vehicle movement, the deflector should be secured tightly to the vehicle roof. However, permanent installation steps such as bolting or screwing the deflector through the vehicle roof have obvious disadvantages. In many cases, a mounting unit in the form of a rubber or rubber like gasket is positioned between the vehicle body and the leading edge of the deflector. Preferably, this mounting unit has a groove between spaced apart flaps that are normally glued or otherwise tightly secured to the leading edge margin of the deflector. In many installations, a downwardly facing contact surface of this gasket is in turn secured to the vehicle roof by a pressure sensitive adhesive that either forms a part of the gasket or is installed as a separate component between the gasket and the deflector.

One problem with such adhesive fastening, however, is that to the extent the adhesives are sufficiently strong to ensure that there will be no undesired separation of the deflector from the vehicle roof, the adhesives tend to be so strong as to risk damage to the finish of the car. Even if the adhesion is otherwise satisfactory, removal for washing or polishing the vehicle is problematical, since re-attachment at frequent intervals requires new adhesive or presents other problems. Accordingly, attempting to utilize gasket adhesion as a method of retaining the deflector in place has several disadvantages.

In view of these circumstances, and the general configuration of most deflectors, various auxiliary fastening means have been considered. However, the structures of such prior auxiliary hold-down or clamping devices have not always been satisfactory. Thus, an ideal hold-down device would be one which would permit the deflector to be readily removable when this is desired for any reason. In addition, the auxiliary hold-down should not damage or become a permanent part of the vehicle roof. Such a unit should also hold the entire leading edge in contact with the roof, and exert enough downward force for this purpose without unduly deforming or bending the air deflector itself.

Ideally, an auxiliary hold-down device would provide a range of movement which would be sufficient to enable a snap-on/snap-off type action to be provided and still provide sufficient travel so as to just slightly deflect the body of the deflector, thus taking advantage of the inherent resiliency of the deflector to apply and maintain a tensile force on the hold-down device, and resulting in a well-distributed, overall compressive load on all parts of the deflector, including those adjacent the hold-down site. Another desirable feature in an ideal hold-down device would be a rapid, comparatively fail-safe, snap-in action, and means for retaining to hold-down in a desired position of use.

Another feature of an ideal air deflector auxiliary would be a hold-down which is positionable such as not to interfere with the aerodynamics of the vehicle, and preferably, therefore, avoid creating the noise and turbulence which it is an object of the deflector to eliminate in the first place.

In view of the shortcomings of the prior art, it is an object of the present invention to make an improved hold-down device for a sunroof air deflector.

Another object of the invention is to make a hold-down device for a sunroof deflector which includes a latch having an over-center or positive locking action.

Yet another object of the invention is to provide a sunroof air deflector latch wherein a latching and locking mechanism is contained within a compact housing that may be positioned virtually flush with the top surface of the deflector shield portion of a sunroof air deflector.

A further object of the invention is to provide a sunroof air deflector hold-down device which includes an angled lever portion having a pivot point movable over-center relative to the load or hold-down point and providing for a substantially vertical motion of a carrier supporting a hold-down hook.

A still further object of the invention is to provide a compact sunroof air deflector hold-down assembly having a hook that is compatible with curved as well as straight surfaces forming portions of the opening for the sunroof, and is useful without change on both right- and left-hand sides of the deflector.

An additional object of the invention is to provide a novel hold-down arrangement for a sunroof air deflector wherein the hold-down hook includes a bight portion adapted to permit a spring action within the hook and wherein the hook may pivot at least moderately about the axis of its shank so as to engage body parts defining the roof opening that are angularly related to the shank of the hook, and also accommodate right- and left-hand applications.

Another object of the invention is to provide a mechanism for a sunroof air deflector hold-down which is readily inserted within an opening in a sunroof air deflector but which resists unintentional removal and wherein the latching lever may be locked in position relative to the housing after the deflector is positioned and secured.

The foregoing and other objects and advantages of the invention are achieved in practice by providing a hold-down mechanism that includes a housing positionable within an opening in the sunroof air deflector shield body, and having horizontal and vertical guides to provide a vertical tensioning motion and an over-center locking action of a hook carried by a locking lever pivotally mounted in the housing and with the parts being arranged to provide a distributed compressive mounting load on the shield body, retaining it in place adjacent the sunroof opening.

The exact manner in which the foregoing and other objects and advantages of the invention are achieved in practice will become more clearly apparent when reference is made to the following detailed description of the preferred embodiments of the invention set forth by way of example and shown in the accompanying drawings, in which like reference numbers indicate the corresponding parts throughout.

BRIEF DESCRIPTION OF THE DRAWINGS

FIG. 1 is a perspective view of a vehicle having a sunroof and showing the sunroof deflector hold-down system of the present invention installed in position of use;

FIG. 2 is an exploded perspective view, on an enlarged scale and showing the essential components of one of the hold-down devices of the invention, exaggerated in size for purposes of illustration;

FIG. 3 is a vertical sectional view taken along lines 3—3 of FIG. 1 and showing a sunroof air deflector in position with one hold-down device of the invention in its closed and latched position of use; and, FIG. 4 is a view similar to that of FIG. 3, but showing the locking action of the hold-down apparatus.

DESCRIPTION OF THE PREFERRED EMBODIMENTS OF THE INVENTION

While the invention may be embodied in various forms, a preferred form of apparatus will be described wherein a unitary housing is matched to an insertion opening in the deflector shield and includes hook support guide means in the form of a pair of vertical slots, a pair of horizontal slots, with a right angle or two-arm lever and hold-down latch being positioned by the housing to carry a hook through a vertical travel path and provide an over-center locking action.

Figures 1, 2:
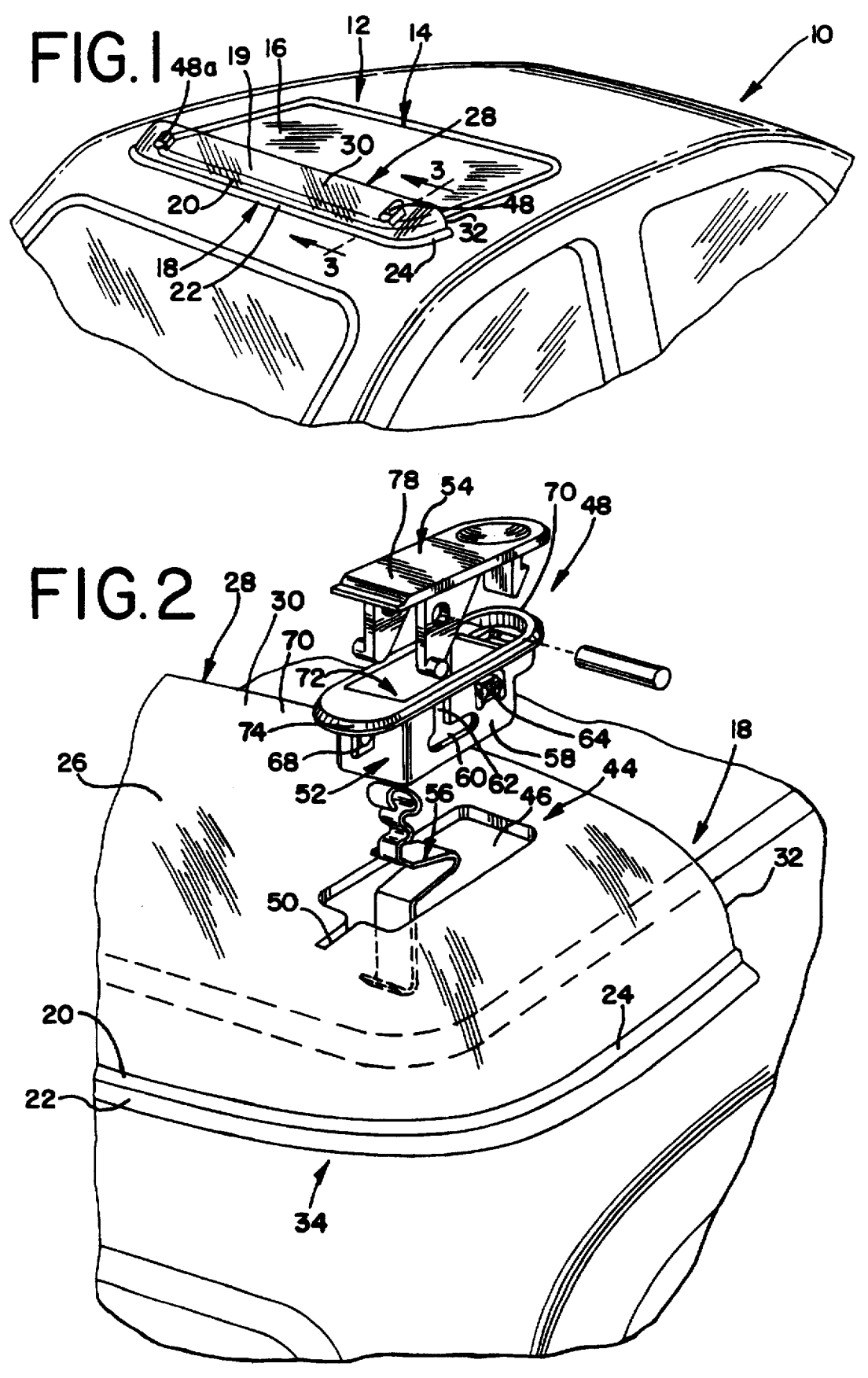

Referring now to the drawings in greater detail, FIG. 1 shows a vehicle generally designated 10 to have a roof portion generally designated 12 with an opening generally designated 14 therein in which a retractable sunroof 16 is positioned. A sunroof air deflector generally designated 18 and made according to the invention is positioned atop the vehicle roof 12.

As illustrated in FIGS. 1–4, the deflector 18 itself includes a shield body 19 defined by a leading edge portion 20 and shown to include a principal leading edge portion 22 disposed generally transverse to the vehicle movement axis and a pair of opposed swept back or wing portions 24. The body 19 of the deflector 18 also includes a free trailing edge portion generally designated 28 and shown to include a center, generally transverse portion 30, and a pair of outer free margins 32 of the trailing edge which meet the ends of the wing portions 24 of the mounting edge adjacent the roof of the vehicle. As is known in the art, a mounting gasket generally designated 34 typically has spaced apart flaps 36, 38 defining therebetween a slot or groove 26 for the leading edge of the deflector shield body 19. Other gasket configurations may of course be used. A downwardly facing contact surface 40 of the mounting gasket 34 is urged into contact with the outer surface 42 of the vehicle roof 12 by the hold-down devices to be described. The gasket flaps 36, 38 are adhesively attached to the entire leading edge 20 of the deflector shield, while the downwardly directed, top-engaging contact surface seals the gasket tightly against the roof in response to the hold-down load applied by the device to be described.

Referring now to FIGS. 2–4, it will be seen that contoured margins generally designated 44 of the shield body 19 form an opening 46 for the inventive combination hold-down and latch assembly generally designated 48. The margins 44 are preferably generally rectangular with radiused corners to avoid stress concentration and cracks resulting therefrom.

Referring now to the hold-down and latch assembly 48, the principal portions thereof include a housing generally designated 52, a lever assembly 54, and a load applying hook unit generally designated 56. In viewing FIG. 2, it will be understood that, both left- and right-hand hold-down and latching units 48, 48a being substantially identical, only one is described in detail.

Referring now in particular to the housing generally designated 52, it is shown that each of a pair of parallel sidewalls 58 includes a T-slot comprising horizontal and vertical legs 60, 62 and a pair of outwardly biased snap-in rear housing retainer units 64 having tapered upper surfaces adapted to engage a lower surface portion 66 of the shield body 19. In addition, a front housing retainer clip 68 extends forwardly from the front surface of the housing 52 engages the margins 44 defining the latch opening 46 on three sides.

According to the preferred form of the invention, a top opening generally designated 72 is provided in the housing 52 for receiving the lever 54, and an overhanging, load-distributing flange 74 is provided to ensure that the housing 52 remains in snug contact with, and can apply a compressive load to, the upper surface 76 of the deflector shield body 19.

In the preferred form of invention, the hold-down lever 54 is constructed and arranged so as to include a first leg 78 which extends generally horizontally in the locked position and a second or offset leg generally designated 80 having identical left- and right-hand leg portions 82, 84. The legs 82, 84 are secured at their upper ends to a lower surface of the lever 54, and the lower ends of the legs 82, 84 include small axially aligned stub shafts 86, 88, collectively defining the pivot point for the lever 54. This pivot axis moves back and forth as the stub shafts 86, 88 ride back and forth within the horizontal slot 60.

A trailing edge locking latch 90 is preferably integrally formed with a portion of the first leg 78 of the lever 54. A hook carrier in the form of a roll pin 92 extends through a pair of opposed openings, one on each portion 82, 84 of the second leg 80. The ends of the roll pin 92 in use are guided by and slide within the vertical slot 62, while the center of the pin 92 extends through an elongated or oval shaped eye portion 94 of the latching hook 56. The hook 56 includes a lower barb or hem-engaging portion 96 (FIGS. 3 and 4), an elongated shank 98 and a stiff but resilient bight portion 100 of generally U- or V-shape in elevation. A bottom opening 99 in the housing 52 permits the hook to move up and down within the housing.

As illustrated in the drawings, the latching element 90 on the first leg 78 of the lever 54 includes a locking shoulder 104 that engages and undercut portion 106 of the housing 52, thus helping to prevent unintentional release of the hold-down.

Owing to the various design features of the locking and hold-down device just described, its operation is extremely simple. The locking and latch assembly is assembled merely by dropping the entire unit 48 through the opening 46 in the deflector shield. The front housing retainer clip 68 snaps into position with its upper surface engaging the lower surface portion 66 of the margins of the shield body 19 defining the front of the opening 46.

At or about the same time, the outwardly biased, snap-in rear housing retainer units 64 deflect in and then out, with their upper surfaces also snapping into positions engaging the lower surface 66 of the shield body 19 defining the sides of the opening 46. At this point, the lower surface of the overhanging flange 74 is seated on the upper surface 76 of the deflector body 19, thus creating a snug seal. If desired, a gasket may be provided in the area between these surfaces.

When it is desired to engage the barb 96 of the hook 56 beneath the lowermost portion of the sunroof opening hem 110, as shown in FIG. 4, the lever is actuated by releasing the hold-down latch 90 and lifting the rear of first leg 78 upwardly. When the first leg 78 of the latch is urged upwardly and forwardly, the small stub shafts 84, 86 slide rearwardly in the horizontal slot 60. In some cases, the pin 92 may move down far enough to enter the horizontal portion 60 of the T-slot.

This action lowers the position of the roll pin 92, permitting the barb 96 of the spring 56 to swing clear of the hem portion 110 formed as a part of the vehicle sunroof opening 14. When the hook 56 is swung forward into a position wherein the barb 96 underlies the hem 110 and the shank 98 is substantially vertical, the first level is rotated clockwise as shown in FIG. 4. This moves the stub shafts or pivot points forward in the horizontal slot 60, at the same time causing the roll pin 92 to move upwardly in the vertical slot 62.

With the stub shafts 84, 86 being in the position shown in FIG. 3, to the left of the vertical slot center line, the first leg 78 of the lever 54 is in a fully closed position and spring forces augment the over-center hold-down feature of the latch, preventing it from releasing.

Hence, by arranging the horizontal slot 60 so as to have portions lying to either side of the center line of the vertical slot 62, along which line the vertical forces imposed by the hook are exerted, an over-center retaining action is provided.

As illustrated, the eye 94 of the hook 56 is somewhat elongated, permitting the hook to pivot about the axis of its shank 98. Accordingly, where the hem 110 of the sunroof opening is not perpendicular to the movement axis of the vehicle, as where the sunroof opening has a rounded or radiused corner, the hook can be swung through an arc so as to squarely engage the hem in a snug manner. A centering action can be provided where this engagement occurs in a rounded or radius portion of the opening, as just described. By allowing the hook to swing about its shank axis, left- and right-hand units need not be made, since any angular position peculiar to a right or left side can be accommodated.

The provision of the bight 100 allows some flexibility and a load carrying function to be carried out, the hook acting also as a spring with a preselected rate and controllable tension. When the unit is installed as in FIG. 3, the sunroof 16 is closed and a gasket 112 or the like may engage the shank of the hook.

With the sunroof open, the arrangement of hold-down latch is such that accidental unlocking is virtually impossible and release is easily accomplished. The nose portion of the leg 78 may include a small notch 114 to engage an undercut 116 on the top of the housing to minimize leakage. Removal of the entire latching assembly 48 is extremely easy, with the various retainers merely requiring push-in pressure and a pivoting action for removal, once the barb 96 of the hook 56 is removed from beneath the hem.

Upon releasing both hold-downs 48, 48a, the deflector unit can simply be lifted up and removed. The openings 46 are located in the shield generally adjacent the corners, and sufficiently ahead of the free or trailing edge of the shield so as to exert the downforce on the shield in areas that will insure snug contact between the lower surface 40 of the gasket and the top surface 42 of the vehicle roof 12. If the hold-down units 48, 48a are too far back, the downforce on the leading edge of the shield will be too little, and if the hold-downs are too far forward, the mounting gasket will be spaced from the roof near the ends of the wings and the gasket.

In the preferred form, the slots 60, 62 combine to form a T-slot arrangement but this is not strictly necessary. As long as a guide function is provided, of the desirable characteristic resolving forces into a substantially vertical lift motion can be achieved. Various forms of retainers for the housing can be provided, with the illustrated forms being presently preferred. Likewise, arranging for the lever to have one or two legs, reversing the arrangements of the pivots or hook holders, etc. can be accomplished by ways other than those illustrated, as will be apparent to those skilled in the art.

A preferred embodiment of the invention, having been described in detail, it is anticipated that modifications and variations to the described form of apparatus will occur to those skilled in the art and it is anticipated that such alterations and changes may be made without departing from the spirit of the invention of the appended claims.

I claim:

1. In combination, a sunroof air deflector and a releasable hold-down and latching system, said deflector including a shield body portion defined at least in part by a leading edge portion and a free trailing edge portion, said leading edge portion including a principal portion and a pair of spaced apart wing portions all adapted to be positioned closely adjacent a vehicle roof, said free trailing edge portion having a principal portion disposed generally horizontally and a pair of generally vertically extending portions extending toward and joining the ends of said wing portions, at least one area between said leading and trailing edge portions defining an opening for receiving an air deflector hold-down assembly, and a hold-down assembly received in said opening, said hold-down assembly including a housing portion, a lever positioned within said housing, said lever including a first leg with an outer surface portion adapted to be moved by the finger of a user and at least one offset leg, said offset leg including a hook carrier and a pivot portion, said housing including means for guiding said hook carrier through a substantially vertical path, and means for guiding said pivot portion through a substantially horizontal path, said horizontal path including portions lying to either side of said vertical path, said pivot portion being movable within said horizontal guide means between unlocked and over-center positions, and being operative to move said hook carrier through said vertical movement path, and a hook positioned by said carrier and extending downwardly beneath said housing for engagement with a hem portion of a sunroof opening, whereby swinging said first leg of said lever from an open to a closed position raises said hook vertically and moves said pivot portion from said unlocked position to said over-center position.

2. A combination as defined in claim 1 which further includes a mounting gasket affixed to said leading edge of said shield body, said gasket having a downwardly directed surface for engaging the roof of an associated vehicle.

3. A combination as defined in claim 1 wherein said at least one opening in said shield body comprises a pair of openings, each being adjacent a laterally outer margin of said deflector.

4. A combination as defined in claim 1 wherein said means for guiding said hook carrier through a substantially vertical path comprises a pair of vertical slots in a side wall portion of said housing.

5. A combination as defined in claim 1 wherein said means for guiding said pivot portion through said substantially horizontal path comprises a pair of substantially horizontally extending slots disposed in opposed side wall portions of said housing.

6. A combination as defined in claim 1 wherein said means for guiding said hook carrier and said pivot portion comprise vertically and horizontally extending slots formed in a portion of said housing, said lever having portions associated therewith that are slidably movable within said slot.

7. A combination as defined in claim 5 wherein at least one leg comprises a pair of legs, and wherein said pivot portion comprises an outwardly extending stud on each leg, each of said studs being received in said horizontal slot.

8. A combination as defined in claim 1 wherein said hook carrier comprises a pin extending through said at least one leg, said pin having its end portion slidably received in at least one of said vertically extending guide slots.

9. A combination as defined in claim 6 wherein said pair of vertical and horizontal slots combine to form a pair of T-slots in said housing.

10. A combination as defined in claim 1 wherein said hook includes a shank portion affixed to said hook carrier by an elongated eye, thereby permitting the barb portion of said hook to move freely through an arc having a center aligned with the axis of said hook shank.

11. A combination as defined in claim 1 wherein an upper portion of said housing includes a support flange adapted to engage a upper surface of said sunroof adjacent said margin for receiving said hold-down.

12. A combination as defined in claim 1 wherein said housing further includes at least one retainer clip extending in use into contact with a portion of said deflector body.

13. A hold-down assembly for a sunroof air deflector, said assembly being adapted to be received within an opening in the sunroof deflector to apply hold-down force to said deflector while said deflector is positioned over the opening for a vehicle sunroof, said assembly comprising, in combination, a housing portion, a lever positioned within said housing, said lever including a first leg with an outer surface portion adapted to be moved by the finger of a user and at least one offset leg, said offset leg including a hook carrier and a pivot portion, said housing including means for guiding said hook carrier through a substantially vertical path, and means for guiding said pivot portion through a substantially horizontal path, said horizontal path including portions lying to either side of said vertical path, said pivot being movable within said horizontal guide means between unlocked and over-center positions, and being operative to move said hook carrier through said vertical movement path, and a hook positioned by said carrier and extending downwardly beneath said housing for engagement with a hem portion of a sunroof opening, whereby swinging said first leg of said lever from an open to a closed position raises said hook vertically and moves said pivot point from said unlocked position to said over-center position.

\* \* \* \* \*